(12) United States Patent
Adinolfi

(10) Patent No.: US 11,406,065 B2
(45) Date of Patent: Aug. 9, 2022

(54) CASCADING PLANTER CADDY FOR USE ON STAIRS OR OTHER STEPPED SURFACES HAVING LEVELS OF VARYING ELEVATION

(71) Applicant: Thomas M. Adinolfi, Staten Island, NY (US)

(72) Inventor: Thomas M. Adinolfi, Staten Island, NY (US)

( * ) Notice: Subject to any disclaimer, the term of this patent is extended or adjusted under 35 U.S.C. 154(b) by 121 days.

(21) Appl. No.: 17/107,664

(22) Filed: Nov. 30, 2020

(65) Prior Publication Data
US 2022/0167575 A1 Jun. 2, 2022

(51) Int. Cl.
*A01G 9/02* (2018.01)
*A01G 31/06* (2006.01)

(52) U.S. Cl.
CPC ............ *A01G 9/023* (2013.01); *A01G 31/06* (2013.01)

(58) Field of Classification Search
CPC .................................. A01G 9/023; A01G 9/02
See application file for complete search history.

(56) References Cited

U.S. PATENT DOCUMENTS

| | | | | | |
|---|---|---|---|---|---|
| 2,837,866 A | * | 6/1958 | Esmay | .................. | A01G 9/023 47/33 |
| 4,120,119 A | * | 10/1978 | Engel | ..................... | A01G 9/027 47/68 |
| 4,761,914 A | * | 8/1988 | Martinez | ................ | A01G 9/023 47/33 |
| 4,899,487 A | * | 2/1990 | Brownlee | ............. | A47F 7/0071 47/79 |
| 5,095,649 A | * | 3/1992 | Brownlee | ............. | A47G 7/041 47/79 |
| 5,095,653 A | * | 3/1992 | Guldberg | ............... | A01G 9/023 47/73 |
| D363,688 S | * | 10/1995 | Turrentine | ................... | D11/143 |
| 5,662,895 A | * | 9/1997 | Welte | ..................... | C07K 14/53 424/85.1 |
| 5,664,367 A | * | 9/1997 | Huang | ................... | A47G 7/044 248/311.2 |
| 5,852,895 A | * | 12/1998 | Sinanan | ................. | A01G 9/022 47/33 |
| D407,994 S | * | 4/1999 | Adinolfi | ..................... | D6/675.3 |

(Continued)

FOREIGN PATENT DOCUMENTS

| | | | | | |
|---|---|---|---|---|---|
| CN | 112806186 A | * | 5/2021 | ............. | A01G 9/023 |
| GB | 2141612 A | * | 1/1985 | ............. | A01G 9/023 |

*Primary Examiner* — Monica L Barlow
(74) *Attorney, Agent, or Firm* — Matthew M. DiMaggio, Esq.

(57) ABSTRACT

Embodiments of the disclosed technology are directed to devices and/or apparatuses for receiving, housing and displaying plants on surfaces having a repetitive pattern of elevation changes resulting in multiple horizontal planar surfaces of varying elevation. The apparatus may be, for example, a caddy adapted to conform to the staggered pattern of one or more steps, curbs, ledges, and/or walls. The caddy may be further adapted to receive and store, at an angle between 0 degrees and 90 degrees, an elongated planter. In further embodiments, a self-contained planter may be disclosed. The planter may be adapted for receiving soil, planting substrate and/or plants. The self-contained planter may have a base region adapted to conform to the staggered pattern of one or more stepped surfaces.

8 Claims, 9 Drawing Sheets

(56) References Cited

U.S. PATENT DOCUMENTS

| | | | | |
|---|---|---|---|---|
| D462,033 S * | 8/2002 | Reichert | ............... | D11/155 |
| 9,844,188 B2 * | 12/2017 | Legerton | ............... | A01G 9/033 |
| 2003/0005625 A1 * | 1/2003 | Reichert | ............... | A01G 9/023 |
| | | | | 47/65.5 |
| 2009/0211154 A1 * | 8/2009 | DiMaggio | ............... | B62B 3/10 |
| | | | | 47/83 |
| 2011/0258925 A1 * | 10/2011 | Baker | ............... | A01G 9/023 |
| | | | | 47/66.1 |
| 2015/0150198 A1 * | 6/2015 | Sinha | ............... | A01G 27/00 |
| | | | | 29/891 |
| 2020/0205351 A1 * | 7/2020 | Leon | ............... | A01G 27/003 |

* cited by examiner

CASCADING PLANTER CADDY FOR USE ON STAIRS OR OTHER STEPPED SURFACES HAVING LEVELS OF VARYING ELEVATION

FIELD OF THE INVENTION

The present invention relates to planters or flower boxes, particularly to containers adapted for displaying plants and flowers in a cascading arrangement.

BACKGROUND OF THE INVENTION

Plants and flowers are oftentimes used as a means to improve local area appearance, and improve the attractiveness and appeal of a home or yard. In appropriate climates, outdoor flowers and plants in particular are employed to flourish and beautify a surrounding area. With the popularity of flowering plants for decorative and landscaping purposes, gardeners often use potted flowers on outside decks, porches, and patios, including railings or fencing that often borders a perimeter.

Pots, planters and planter boxes are commonly used for growing various types of flora in locations which do not otherwise have soil of suitable quality or depth. Typically, such receptacles are used to grow plants in or around buildings. For example, these receptacles may be used in the living or working areas of buildings, or on balconies, stairs, roof tops, ledges, windows, decks or the like. Planter boxes are also used in small, raised gardens, greenhouses or similar structures designed for growing plants. Planter boxes ordinarily employ a simple design having an open top box-like container within which a quantity of plant growing material is placed. The plant growing material may be commonly formed of soil, with fertilizer mixes, or peat-moss or the like.

Conventional planter boxes must be regularly watered, as required, in order to promote the plant growth and preserve the plants. However, the watering requirement is frequently overlooked by the planter owners, particularly at times when they may be away from the premises within which the planter is located. Frequently, plants are given either too much water or too little water. In addition, because of evaporation losses or rapid plant root water absorption, planters tend to be too dry between regular watering, which adversely affects the plant growth. Plant in individual pots present the issue of requiring a lot of time spent watering to ensure the water permeates the entirety of the subsurface plant growth. Thus, it would be desirable to have the ability to disperse water into a single point or region of the planter and have the water permeate the entirety of the soil on its own accord or under force of gravity.

In urban and suburban settings, brownstones and apartment buildings often have small porches or balconies that residents use for outdoor relaxation, yet space is typically quite limited. Often, there is little to no space to store guest chairs, grilling equipment, outdoor toys, or other items typically used on porches and balconies. Similarly, there is often little space to place flowerpots or planters. Long narrow flowerpots may be placed adjacent to the porch or balcony railing, or round pots may be placed in corners, in an attempt to minimize the loss of space on the porch surface. However, space limitations can be so severe that any porch or balcony surface placement becomes impractical. These structures also oftentimes include stairs, but the placing of individual pots on stairs can be cumbersome and the wide diameter of some pots may partially obstruct the path of a person traversing the stairs.

Modular planters are also well known in the art. U.S. Pat. No. 4,120,119 A describes a continuous modular sectional flower box unit with longitudinal trough-like receptacles that are connected together by an angular elbow coupler receptacle with open flanged ends dimensioned to fit snugly within and against inside surfaces proximate an open end of the longitudinal trough-like receptacles and rigidly secured together by glue or screws. The other ends of the longitudinal trough-like receptacles is covered by an end cap with a wall-like member having a flange projecting outward from its bottom and side edges. This end cap is dimensioned to ensure that the flange will fit snugly across the width of and against an inside surface of an open end the longitudinal trough-like receptacles, for rigid attachment thereto by suitable means, such as glue or screws. Also, a splicer and stiffener plate with a flange are dimensioned to fit across the width of and snugly against inside surfaces proximate the open ends of two of the longitudinal trough-like receptacles that are abutted together and rigidly secured thereto by attachment means such as, glue or screws.

U.S. Pat. No. 5,664,367 A describes an artistic flower planting box that is hangable on a building terrace or patio having a flower planting box and a hanging plate. The hanging plate is channel shaped and placed on an upper surface of a terrace wall of a building. The flower planting box is elongated in shape with an upper open side, forming and interior for soil and flowers. The flower planter box is assembled with the hanging plate by bolts screwing into a plurality of threaded holes in a rear side of the flower planter box and a front side of the hanging plate.

U.S. Pat. No. 5,852,895 A describes a raised planter box assembly having a plurality of U-shaped modular planter boxes connected to one another with an open top end portion to allow easy access for planting purposes. The top open end allows a plurality of sliding plates or dividers to be releasably secured therein to form separate planting compartments within the raised planter box assembly. A plurality of drain holes is disposed at each end of each modular planter boxes. Also, a spaced apart support structure having one end attached to a bottom surface of each of the U-shaped modular planter boxes for elevating the planter box assembly above the ground or floor surfaces. These spaced apart support structures include spaced apart height adjusting elevating posts with a through opening therein for communicating with the plurality drain holes to relieve excess water or fluid from the planter box assembly. The other end of the support structure height adjusting elevating posts being in the form of a spike that is disposed in the ground or a platform end portion that is supported by a floor surface, if desired.

However, all of the references of the prior art neglect to address one of the aforementioned shortcomings. That is, none of these references account for elevation changes due to stairs, ledges, curbs, etc. While some planters of the prior art allow vertical, self-contained stackable or nesting planter configurations, none of these take into account the surrounding environment. Likewise, horizontally assembled modular planters are limited to assembly in one or two axis' along the ground and do not account for steps up or down in elevation. Moreover, all of these planters require new soil, plants, etc. That is, not of them facilitate the use of an already potted planter commonly found around many gardens and households.

Accordingly, it is an object of the disclosed technology to provide an elongated planter and/or planter caddy that is adapted to be used on plateaued or stepped surfaces such as stairs.

SUMMARY OF THE INVENTION

Embodiments of the disclosed technology are directed to devices and/or apparatuses for receiving, housing and displaying plants on surfaces having a repetitive pattern of elevation changes resulting in multiple horizontal planar surfaces of varying elevation. The devices and/or apparatus may be, for example, a caddy adapted to conform to the staggered pattern of one or more steps, curbs, ledges, and/or walls. The caddy may be further adapted to receive and store, at an angle between 0 degrees and 90 degrees, an elongated planter. In further embodiments, the apparatuses and/or devices of the disclosed technology may be a self-contained planter adapted for receiving soil, planting substrate and/or plants. The self-contained planter may have a base region adapted to conform to the staggered pattern of one or more steps, curbs, ledges, and/or walls. The disclosed caddy and/or planter may be additionally adapted to be joined to one another in a modular arrangement.

In an embodiment of the disclosed technology, a planter is disclosed. The planter may be used to store a liquid, solid, and/or any other substance in a specified quantity. The planter may be formed of a first material defining a first cavity having a volume. "Volume", for purposes of this specification, may be defined as the amount of space that a substance or object occupies, or that is enclosed within a container.

In one embodiment of disclosed technology, a caddy is disclosed. The caddy may have one or more of the following components: a) a first side wall and an opposing second side wall, each of the first side wall and second side wall having an angled top edge defining an upper end and a lower end of each side wall; and/or b) a front wall and rear wall orthogonally connected between the first and second side walls to form a four-sided box having a substantially rectangular cross section, the four-sided box being pitched at the same angle of the top edges of the first and second side walls. The term "substantially" is defined to be essentially conforming to the particular dimension, shape, or other feature that the term modifies, such that the component need not be exact.

The angle of the top edge may be, for example, between 15 degrees and 75 degrees with relation to a flat horizontal plane. Further, the "flat horizontal plane" for purposes of this specification may be defined as a flat, planar surface or ground onto which objects rest under the force of gravity. Furthermore, the bottom edge of each of the first and second side walls may form a pattern of one or more rises and runs, wherein an edge of each rise is substantially vertical and an edge of each run is substantially horizontal in a pattern substantially conforming to a series of one or more steps.

In a further embodiment, the four-sided box portion of the caddy is adapted to receive a box planter pitched at the same angle of the top edges of the first and second side walls. The box planter may rest on the edges of one or more steps onto which the caddy is placed. The angle of the top edges of the first and second side wall may be between 20 degrees and 50 degrees with in relation to the horizontal plane. Furthermore, the front and rear walls may be tilted forward at an angle corresponding to the angle of the top edges of the first and second side walls.

In still further embodiments, the caddy may have a second rear wall. The second rear wall may be vertically disposed in relation to the horizontal plane. The vertically disposed second rear wall may be joined at a top edge thereof to a bottom edge of the rear wall. The side edges of the vertically disposed second rear wall may be joined to the rear edges of the first and second side walls.

Still further, the disclosed caddy may have a base extending between a bottom edge of the front wall and the bottom edge of the rear wall. The base may be pitched at an angle corresponding to the angle of the top edges of the first and second side wall.

In another embodiment of the disclosed technology, a container is provided for displaying plants on a series of steps. The container may have a first bottom, a first front wall, a first back wall, and first and second side walls disposed on the first bottom such that the first bottom, first front wall, first back wall, and first and second side walls define a first cavity. The first and second side walls may extend below the first bottom and terminate at a bottom edge. The bottom edge may have a staggered arrangement of notches which mirror a top edge of a cut stringer for stairs. A stringer of stairs, for purposes of this specification, is specifically defined as a sawtooth or open stringer known in the field of staircase construction. Such stringers generally have a top edge having a sawtooth pattern adapted to receive a series of steps arranged in an inclined manner for purposes of making a staircase via which individuals may traverse to move between two or more levels of varying elevation. Referring to the disclosed technology, the bottom edges of the side wall may have a mirror image of the sawtooth pattern of a stringer for stairs. That is, the side walls may have a similar appearance to an upside-down stringer. This configuration is to facilitate the placing of the bottom edges of the sides walls onto a series of steps or fixed interval inclines.

In still another embodiment of the disclosed technology, the container is adapted such that the bottom edge of the first side wall and the second side wall are nestable onto a series of steps such that first cavity is disposed at a specified angle. Still further, the container may have a second rear wall vertically disposed between the rear edges of the first and second side walls. The top edge of the second rear wall may abut a bottom edge of the first rear wall forming an angle between 100 degrees and 170 degrees.

In still another embodiment of the disclosed technology, a caddy is provided for displaying an elongated planter box on steps. The caddy may be formed of a first and a second side wall, each having first and second sides, a front edge, a first rear edge, a second vertical rear edge, a top edge, and a bottom edge. The bottom edges may have an inclining series of rises and runs arranged in a sawtooth pattern adapted for placement on the steps between an upper level and a lower level at a specified angle of inclination. The top edges may be substantially straight and inclined at the specified angle of inclination.

The caddy may also have one or more of the following components: a) a first front wall disposed perpendicularly between the front edges of the first and the second side walls; b) a first rear wall disposed perpendicularly between the first rear edges of the first and the second side walls; and/or c) a second rear wall disposed perpendicularly between the second vertical rear edges of the first and the second side walls.

A better understanding of the disclosed technology will be obtained from the following brief description of drawings illustrating exemplary embodiments of the disclosed technology.

A better understanding of the disclosed technology will be obtained from the following detailed description of embodiments of the disclosed technology, taken in conjunction with the drawings.

DETAILED DESCRIPTION

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Referring now to the figures, devices and/or apparatuses are provided for receiving, housing and displaying plants on surfaces having a repetitive pattern of elevation changes resulting in multiple horizontal planar surfaces of varying elevation. The devices and/or apparatus may be, for example, a caddy adapted to conform to the staggered pattern of one or more steps, curbs, ledges, and/or walls. The caddy may be further adapted to receive and store, at an angle between 0 degrees and 90 degrees, an elongated planter.

In further embodiments, the apparatuses and/or devices of the disclosed technology may be a self-contained planter adapted for receiving soil, planting substrate and/or plants. The self-contained planter may have a base region adapted to conform to the staggered pattern of one or more steps, curbs, ledges, and/or walls. The disclosed caddy and/or planter may be additionally adapted to be joined to one another in a modular arrangement.

Figure 1:
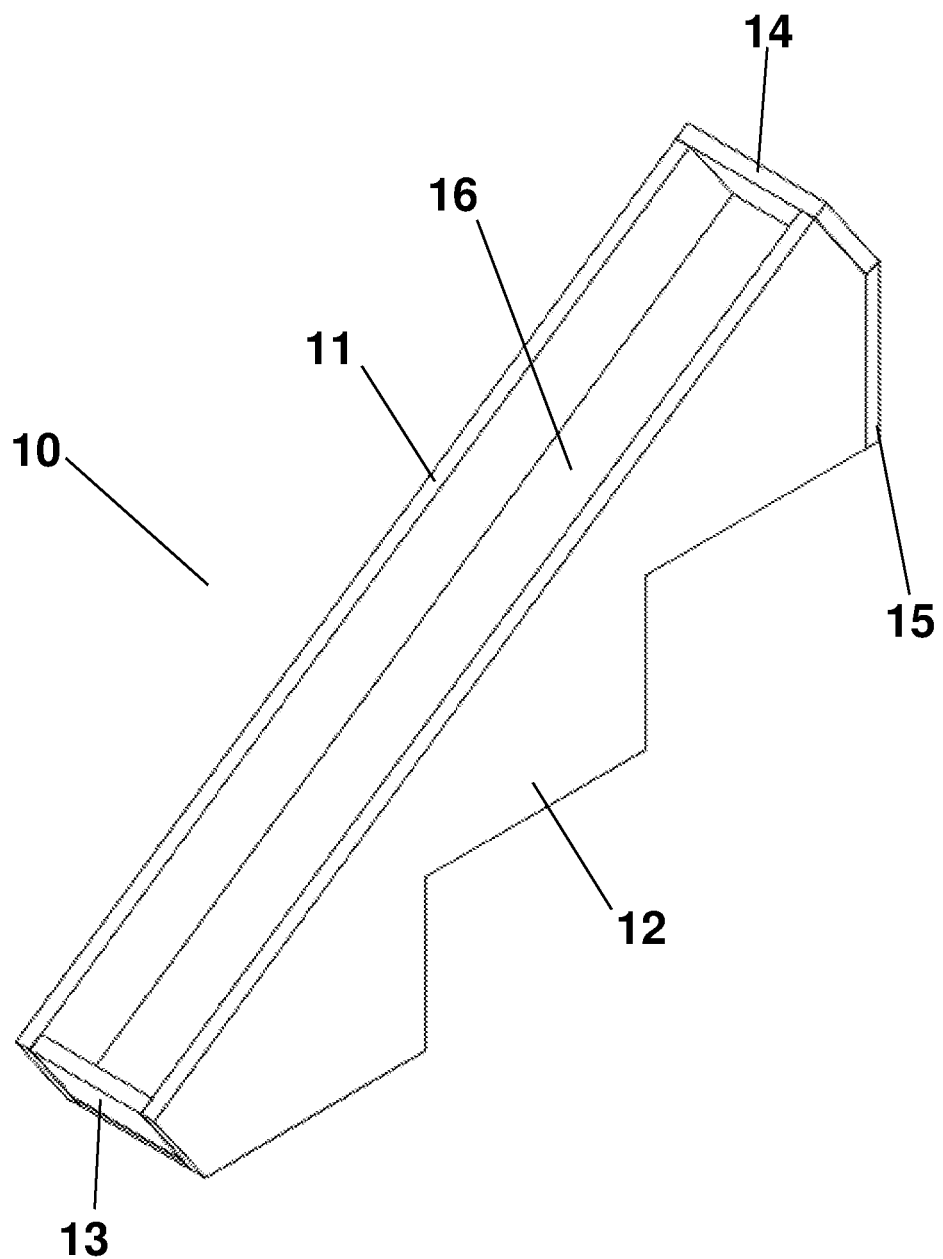
FIG. 1 shows a perspective view of a caddy in accordance with embodiments of the present invention.

Referring now to FIG. 1, a perspective view is shown of a caddy in accordance with embodiments of the present invention. The planter caddy container 10 (hereinafter interchangeably referred to as "planter 10", "planter caddy 10", "container 10" or "caddy with base 10").

The planter caddy 10 forms a receptacle or container adapted to receive a liquid, solid or combination of the two within an interior region or volume defined by the walls and base of the planter. For purposes of this specification, the terms "interior region", "void", and "interior volume" may be used interchangeably in describing the substrate or elongated planter receiving receptacle region of different embodiments of the disclosed technology. It should be noted that "planter 10" and "elongated pot" are separate and distinct terms. That is, "elongated pot" is a general term that collectively refers to any planter of prior art that is longer than it is wide and is adapted to receive plants and planting substrate for purposes of displaying in a horizontal orientation. Such an elongated pot may be designed for placement on a railing, wall, window sill, balcony or abutting any vertical surface.

Referring still to FIG. 1, a caddy is provided for displaying plants on a series of steps. The caddy may have a first bottom 16, a first front wall 13, a first back wall 14, a first side wall 11 and a second side wall 12 disposed on the first bottom 16 such that the first bottom 16, first front wall 13, first back wall 14, and first and second side walls 11, 12 define a first cavity. The first and second side walls 11, 12 may extend below the first bottom 16 and terminate at a sawtoothed bottom edge as depicted. The bottom edge may have a staggered arrangement of notches which mirror a top edge of a cut stringer for stairs. A stringer of stairs, for purposes of this specification, is specifically defined as a sawtooth or open stringer known in the field of staircase construction. Such stringers generally have a top edge having a sawtooth pattern adapted to receive a series of steps arranged in an inclined manner for purposes of making a staircase via which individuals may traverse to move between two or more levels of varying elevation. Referring to the disclosed technology, the bottom edges of the side wall may have a mirror image of the sawtooth pattern of a stringer for stairs. That is, the first and second side walls 11, 12 may have a similar appearance to an upside-down stringer. This configuration is to facilitate the placing of the bottom edges of the sides walls onto a series of steps or fixed interval inclines.

The caddy 10 may be adapted such that the bottom edge of the first side wall 11 and the second side wall 12 are nestable onto a series of steps. Still further, the caddy 10 may have a second rear wall 15 vertically disposed between the rear edges of the first and second side walls 11, 12. The top edge of the second rear wall 15 may abut a bottom edge of the first rear wall 14 forming an angle between 100 degrees and 170 degrees.

Figure 2:
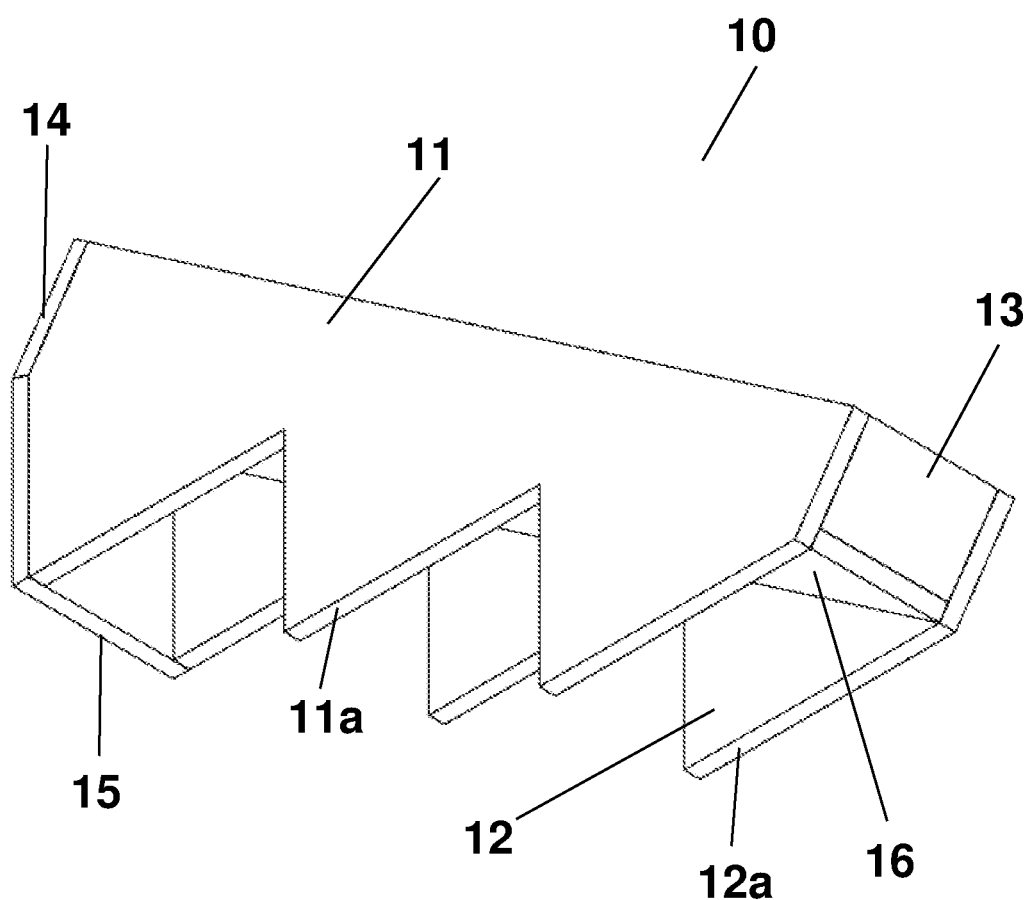
FIG. 2 shows a perspective view of the underside of the caddy of FIG. 1 in accordance with embodiments of the present invention.

FIG. 2 shows a perspective view of the underside of the caddy of FIG. 1 in accordance with embodiments of the present invention. The base 16 may be generally planar. Depicted is the sawtooth shaped bottom edge 11a of the first side wall 11 and the sawtooth shaped bottom edge 12a of the second side wall 12. The entire caddy 10, or one or more components thereof may be composed of one or more of the following materials: wood, terracotta, clay, synthetics, brick, concrete, stone, cement, ceramics, synthetic wood, hard rubber-like material and metals, such as aluminum and stainless steel, plastic, particle board, polymer, thermoplastic, polymer, rubber, elastomer, polyethylene terephthalate (PET), amorphous polyethylene terephthalate (APET), oriented polyethylene terephthalate (OPET), metalized polyethylene terephthalate (MET-PET), polyethylene (PE), low density polyethylene (LDPE), linear low density polyethylene (LLDPE), metalocene linear low density polyethylene (mLLDPE), high density polyethylene (HDPE), metalocene polyethylene (mPE), ethylene vinyl acetate (EVA), polypropylene (PP), metalized oriented polypropylene (mOPP), polystyrene (PS), high impact polystyrene (HIPS), foil, ethylene vinyl alcohol (EVOH), polyamide, Nylon, polyvinyl chloride (PVC) and/or any other material known in the art of hydroponics, gardening and/or outdoor products.

Figure 3:
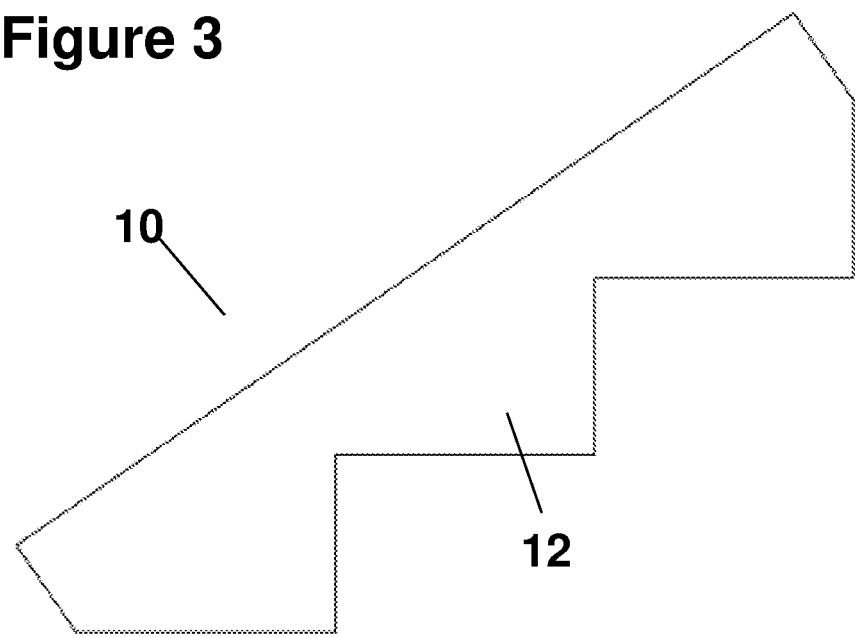
FIG. 3 shows side elevation view of a caddy in accordance with embodiments of the present invention.

FIG. 3 shows side elevation view of a caddy in accordance with embodiments of the present invention. The tops and the bottoms of the side walls are pitched at a substantially similar, fixed slope. This slope may form a specified angle with a flat, horizontal surface onto which the caddy 10 is placed. Such a surface may be, for example, the ground region located near the base of a set of steps.

Figure 4:
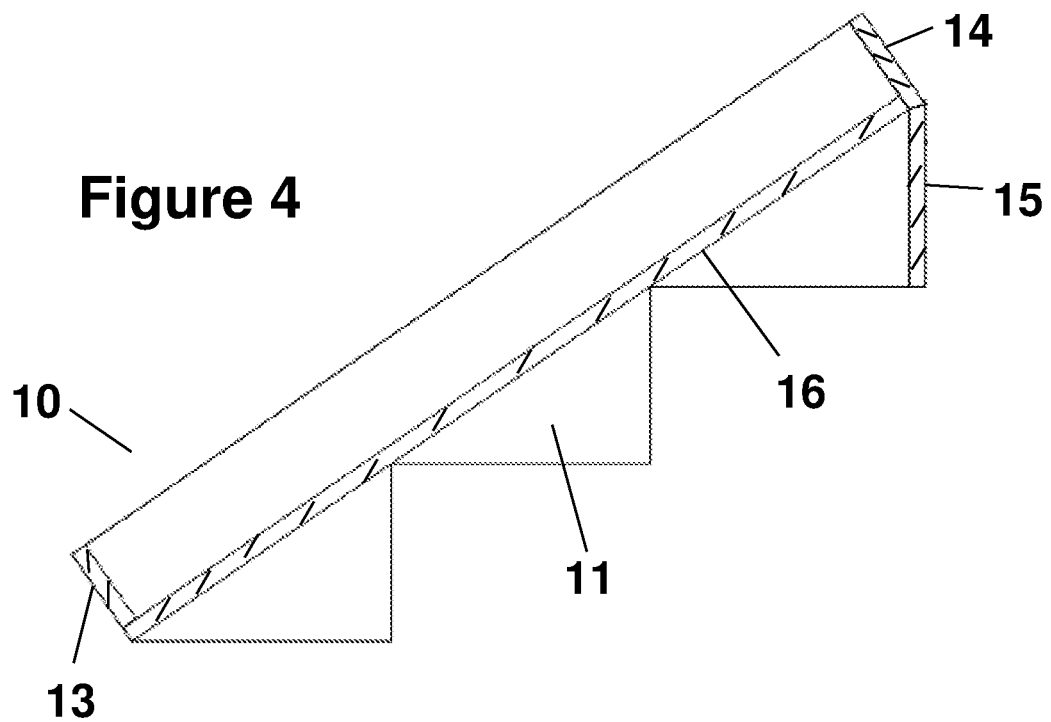
FIG. 4 shows a cut-away, cross-sectional elevation view of a caddy in accordance with embodiments of the present invention.

FIG. 4 shows a cut-away, cross-sectional elevation view of a caddy in accordance with embodiments of the present invention. The caddy 10 may be adapted such that the bottom edge of the first side wall 11 and the second side wall 12 are nestable onto a series of steps such that the first cavity is disposed at a specified angle. The bottom 16 is likewise pitched at a substantially similar angle. Typically, stairs have an angle of between 20 degrees and 50 degrees with relation to the horizontal plane (i.e. the ground) when viewed in two dimensions; the two dimensions being defined by axis's conventionally known to be mathematically defined as X and Y. As such, the sawtoothed pattern of the bases of the side walls 11, 12, and in turn the top edges of the side walls and the bottom 16 may have a comparable angle. Referring still to FIG. 4, the container may have a second rear wall 15 vertically disposed between the rear edges of the first and second side walls 11, 12. The top edge of the second rear wall 15 may abut a bottom edge of the first rear wall 14 forming a specified angle. The top edge of the second rear wall 15 may also abut the rear edge of the bottom 16. As stated, the angle between the first rear wall 14 and the second rear wall 15 may be between 100 degrees and 170 degrees.

Figure 5:
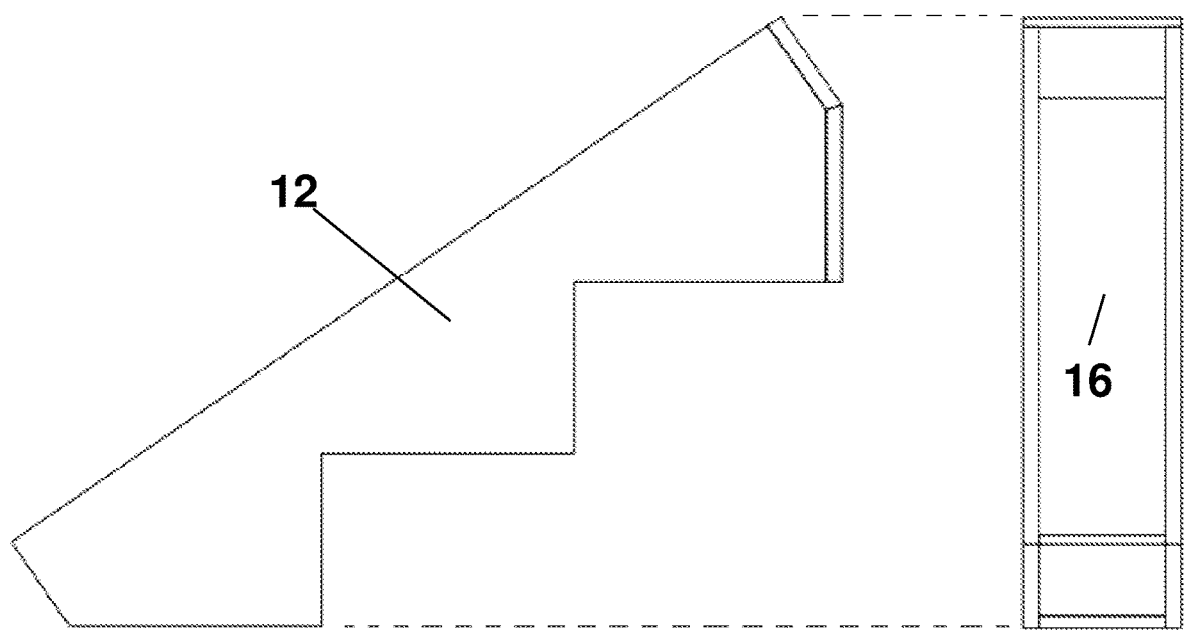
FIG. 5 shows a side and front elevation view of a caddy in accordance with embodiments of the present invention.

FIG. 5 shows a side and front elevation view of a caddy in accordance with embodiments of the present invention. The front elevation view depicts how the caddy would appear from the point of view of someone walking towards the steps. In practice, it is conceived that the caddy 10 would contain an elongated planter box or directly planted flora such as flowers which would give a unique aesthetic to an otherwise bland set of steps. It should be noted that the embodiment depicted may directly receive soil, substrate and plants as it has a bottom 16 to support the planted medium. Alternatively, an elongated planter box may be placed into the caddy. The elongated planter box may conceivably already have plants and soil placed therein. This would enable a user to install plants and growing media while the elongated planter box is on a level surface.

Figure 6:
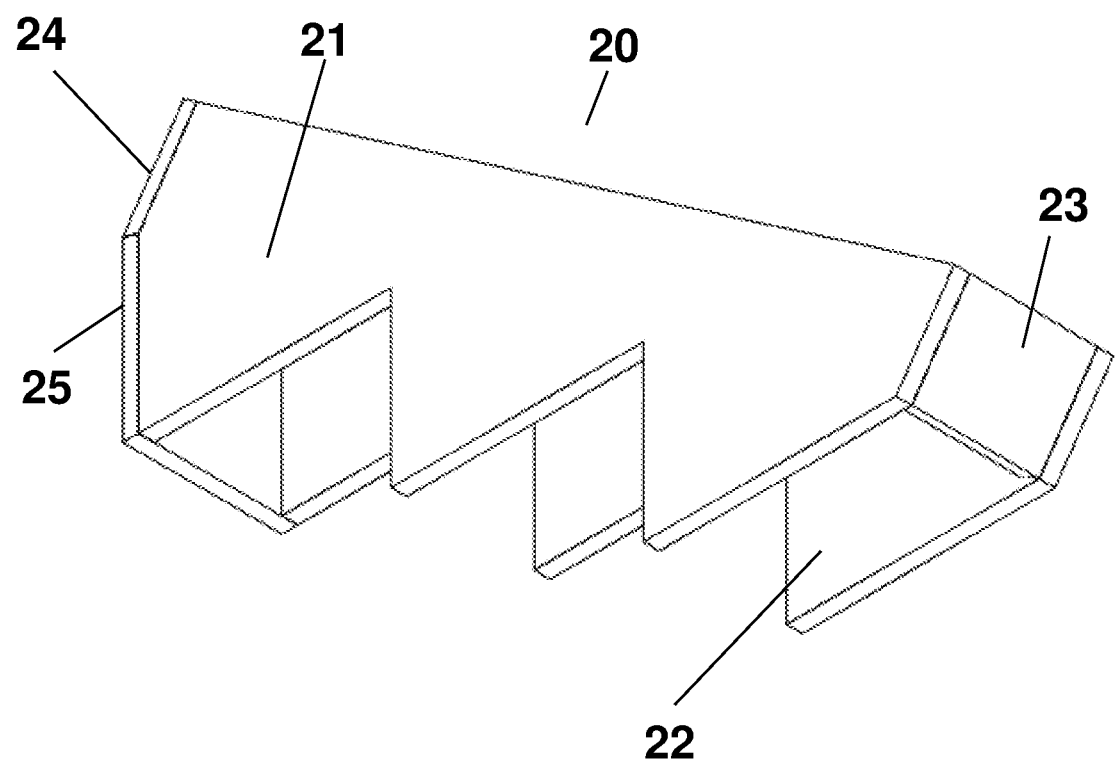
FIG. 6 shows a perspective view of the underside of a caddy in accordance with embodiments of the present invention.

FIG. 6 shows a perspective view of the underside of a caddy in accordance with embodiments of the present invention. The caddy 20 in this embodiment is similar to the above-described embodiments except that it does not have a bottom 16. It has a first side wall 21, a second side wall 22, a front wall 23, a first rear wall 24, and a second rear wall 25. The bottom edges of the side walls 21, 22 have a sawtooth pattern adapted to conform to one or more steps. In this embodiment, when placed on the stairs, the portion of the steps covered by the caddy 20 would be visible when viewed from an overhead perspective.

Figure 7:
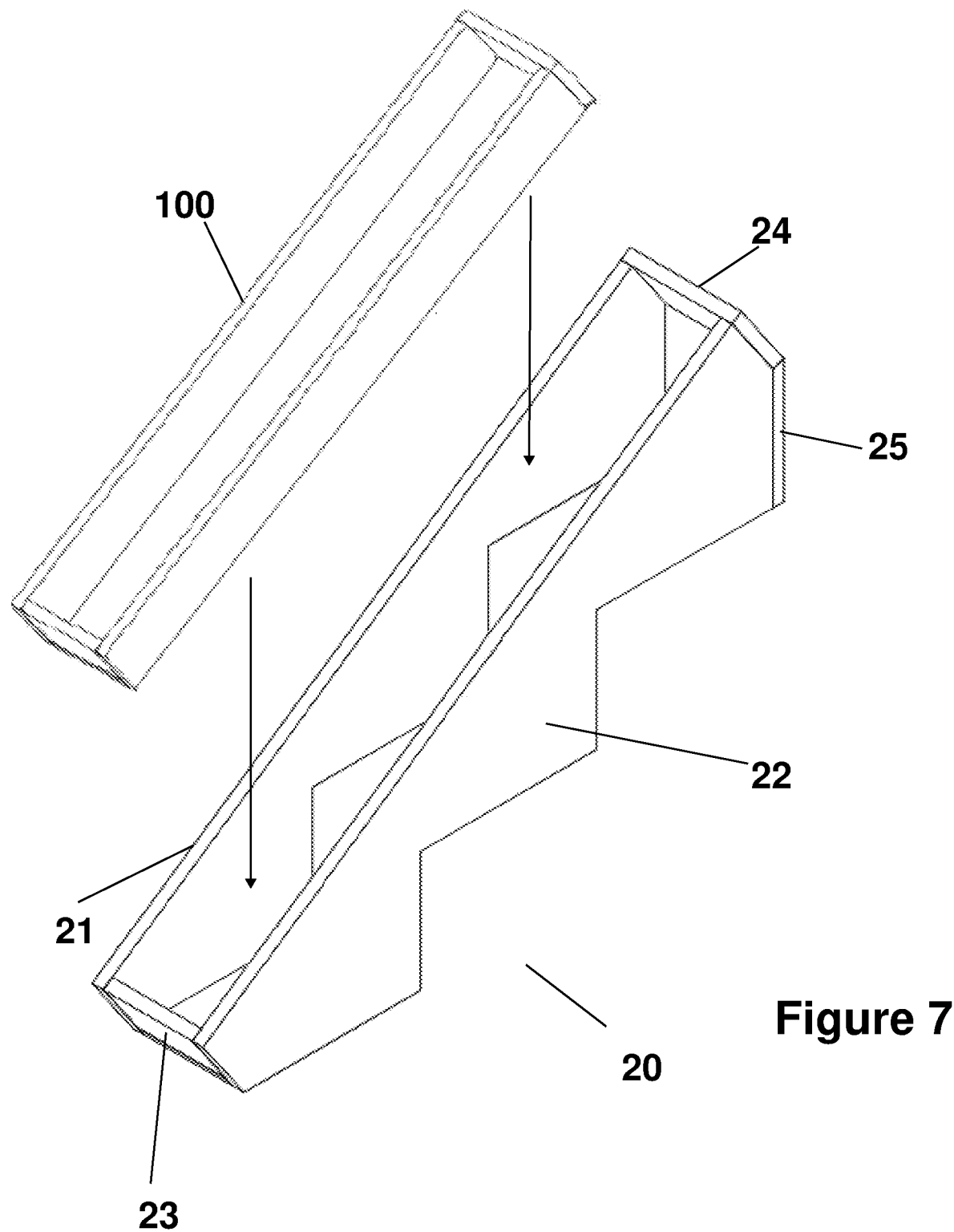
FIG. 7 shows a perspective view of an elongated planter of prior art being received into a caddy in accordance with embodiments of the present invention.

FIG. 7 shows a perspective view of an elongated planter of prior art being received into a caddy in accordance with embodiments of the present invention. Given that this embodiment does not have a bottom, the inserted planter 100 may reside on the front corners of the steps onto which the caddy 20 is placed. The planter 100 may be any generally elongated planter known in the art. The planter 100 may also be included as a part of the disclosed technology. That is, the planter 100 may be a claimed portion of the disclosed technology. In other embodiments, other types of planter box or pots may be employed in conjunction with the disclosed caddy 20. For example, standard round plant pots may also be used with the caddy 20 such that each pot occupies a single step or horizontal surface. That is, in the embodiment shown of the caddy 20 in FIG. 7, three round pots may be placed inside the caddy on each horizontal surface. The caddy 20 would act to secure the pots from falling over and would provide a unique, uncluttered appearance. In other embodiments, the caddy 20 may have any length. That is, the caddy 20 may span anywhere from one step to over six or more steps. Of course the limits on the span of the caddy would be confined to manufacturing, shipping and handling issues presented by having a relatively long design. However, these issues may be mitigated by designing the caddy to be flat-packed and assembled by an end user.

Referring back to the specific embodiment of FIG. 7 with the elongated planter 100, the inclined angle of the caddy 20 may provide other advantages. One advantage may be with respect to irrigation. A user may simply pour water into a single point just inside the first rear wall 24 of the caddy 20. The angled design would cause the water to trickle downslope, eventually reaching the roots located nearest to the front wall 23. This advantage becomes especially useful in embodiments where the caddy 20 is designed to cover a large amount of steps. In times of excess rain or over watering, excess water would simply pour over the front edge of the front wall 23 thereby avoiding the drowning of the roots.

Figure 8:
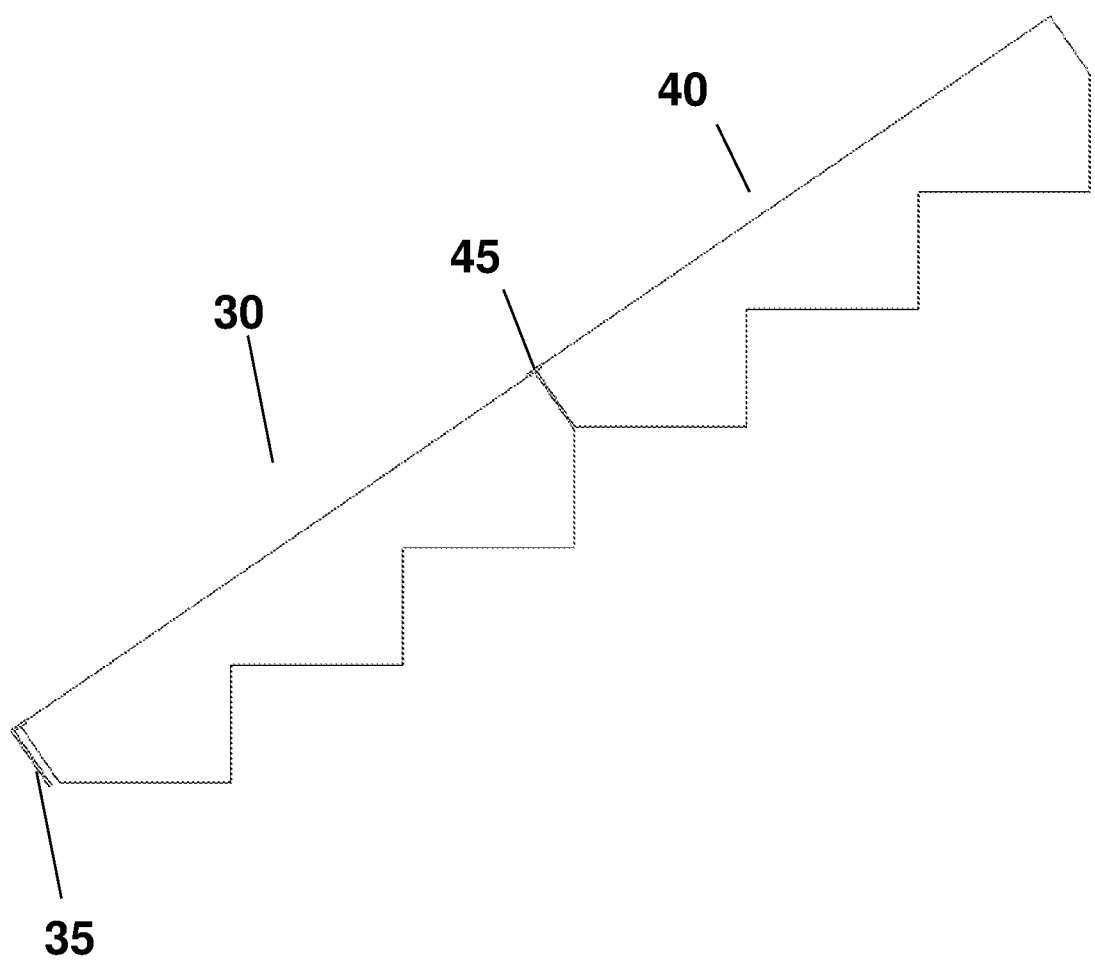
FIG. 8 shows a side elevation view of two detachable modular caddies in accordance with embodiments of the present invention.

FIG. 8 shows a side elevation view of two detachable modular caddies in accordance with embodiments of the present invention. This configuration addresses the above-described issue of manufacturing and shipping a large item. That is, a modular configuration would allow a user to span a long staircase without the need to ship or carry large, unwieldy objects. In this embodiment, two or more caddies are provided. A first caddy 30 has a first hook 35 protruding from a front wall thereof. A second caddy 40 has a second hook 45 protruding from a front wall. The second hook 45 is adapted to be received into a rear region of the first caddy 30.

Figure 9:
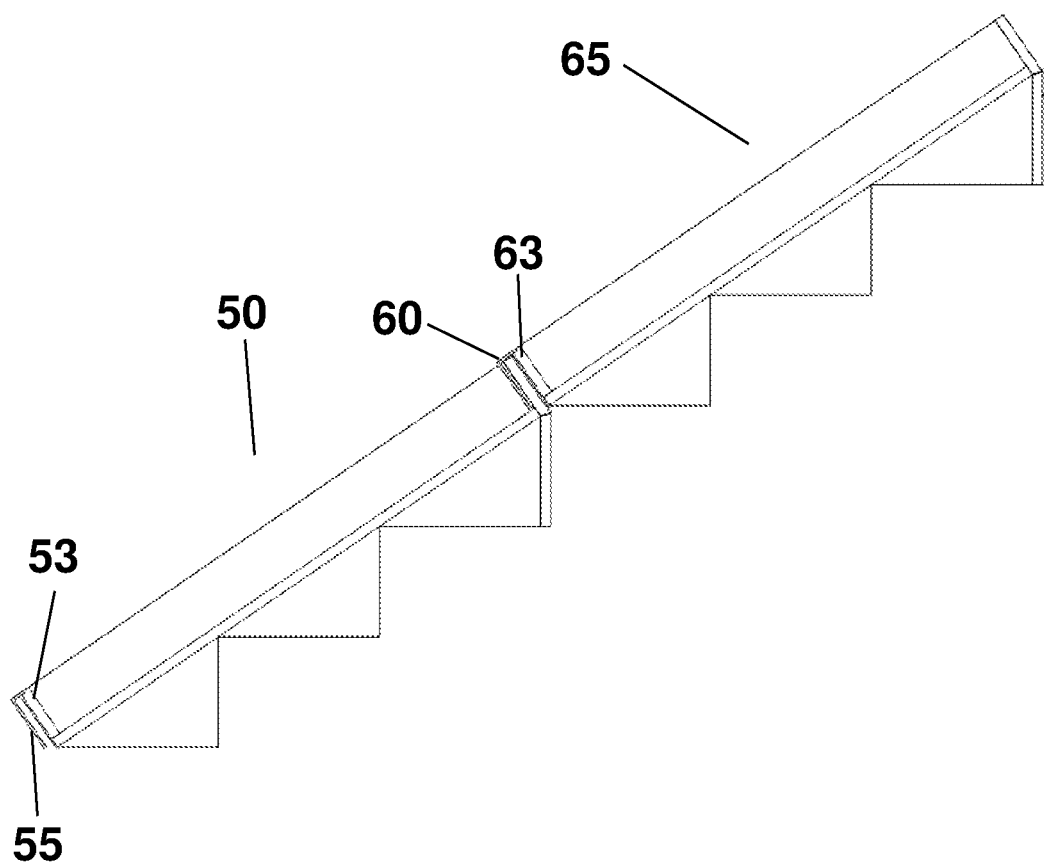
FIG. 9 a cut-away side elevation view of two detachable modular planters in accordance with embodiments of the present invention.

FIG. 9 a cut-away side elevation view of two detachable modular planters in accordance with embodiments of the present invention. In this embodiment, two or more caddies are provided. A first caddy 50 has a first hook 55 protruding from a front wall 53 thereof. A second caddy 60 has a second hook 65 protruding from a front wall 63.

Figure 10:
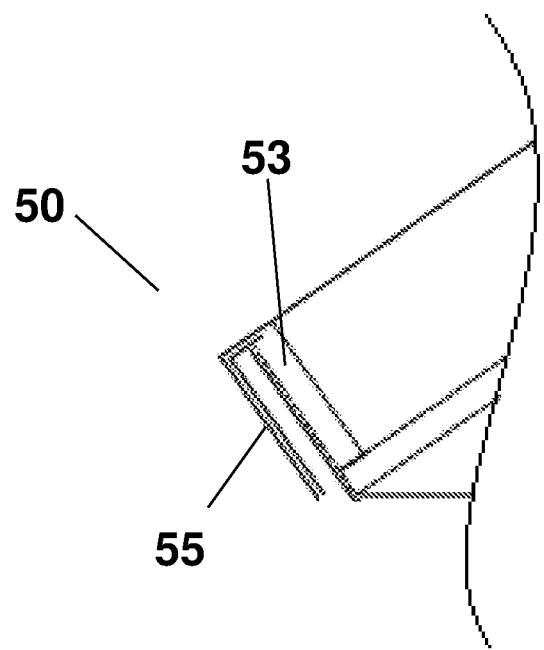
FIG. 10 shows a close-up of one of the brackets of the modular planters of FIG. 9.
Figure 11:
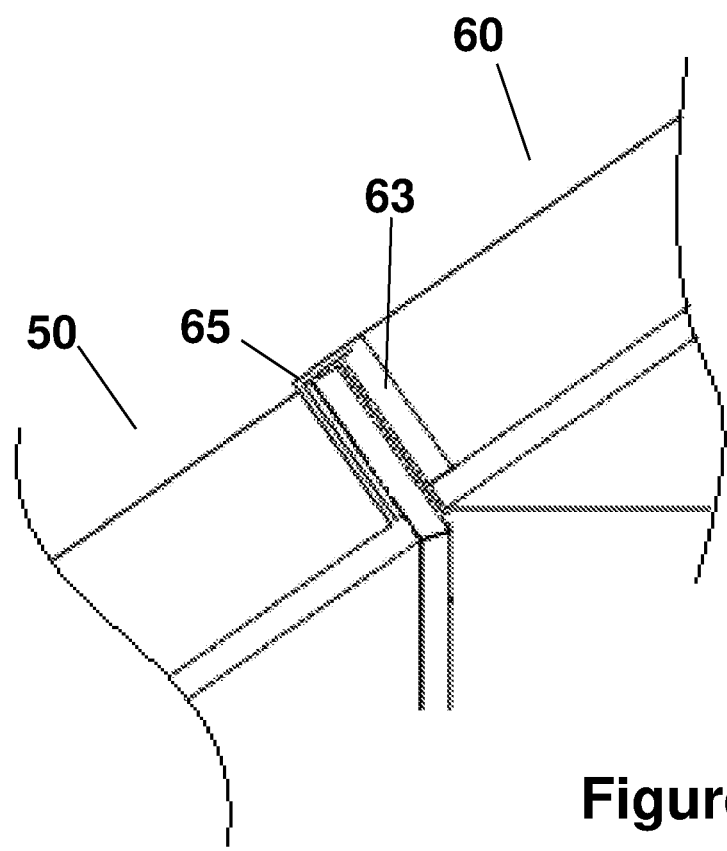
FIG. 11 shows a close-up of one of the brackets of the modular planters of FIG. 9 being used to adjoin the two planters together in accordance with embodiments of the disclosed technology.

FIG. 10 shows a close-up of one of the brackets of the modular planters of FIG. 9. FIG. 11 shows a close-up of one of the brackets of the modular planters of FIG. 9 being used to adjoin the two planters together in accordance with embodiments of the disclosed technology. The second hook 65 is adapted to be received into a rear region of the first caddy 50. The second hook 65 resides along the interior of the rear wall of the first caddy 50. The second hook 65 in essence 'hugs' the rear wall of the first caddy 50. In other embodiments, a slot (not shown) may be disposed inside the rear wall of each caddy. The slot may be adapted to directly receive the hook. The hook may 'click' into the slot to form a strong connection.

One skilled in the art will recognize that an implementation of an actual apparatus or method may contain other components as well. While it is obvious that modification or proper change and combination can be made to the present oral hygiene insert according to the present invention by those skilled in the art, however, without departing from the contents, spirit and scope of the invention, any variations that are intended to achieve the techniques disclosed in the present invention should be within the scope of this invention. Specifically, it should be pointed out that all similar substitutions and modifications are obvious to those skilled in the art, and they are deemed to be within the scope and content of the present invention.

It is to be understood that the foregoing detailed description and accompanying drawings relate to a preferred illustrative embodiment of the invention. However, various changes and modifications may be made without departing from the spirit and scope of the invention.

Accordingly, the present invention is not limited to the specific arrangements as shown in the drawings and described in detail herein above. The exemplary materials, constructions and illustrations included in the preferred embodiment and this patent application should therefore not be construed to limit the scope of the present invention, which is defined by the appended claims.

While the disclosed invention has been taught with specific reference to the above embodiments, a person having ordinary skill in the art will recognize that changes may be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, apparatuses, and devices described hereinabove are also contemplated and within the scope of the invention.

The invention claimed is:

1. A planter caddy, comprising:
a first side wall and an opposing second side wall, each of the first side wall and second side wall having an angled top edge defining an upper end and a lower end of each side wall, wherein the angle is between 15 degrees and 75 degrees with relation to a flat horizontal plane;
a front wall and first rear wall orthogonally connected between the first and second side walls to form a four-sided box having a substantially rectangular cross section, the four-sided box being pitched at the same angle of the top edges of the first and second side walls;
wherein the bottom edge of each of the first and second side walls forms a pattern of one or more rises and runs, wherein an edge of each rise is substantially vertical and an edge of each run is substantially horizontal in a pattern to substantially conforms to a series of one or more steps; and
wherein the front and first rear walls are tilted forward at angle corresponding to the angle of the top edges of the first and second side walls.

2. The caddy of claim 1, wherein the four-sided box portion of the caddy is adapted to receive a box planter pitched at the same angle of the top edges of the first and second side walls.

3. The caddy of claim 2, wherein the box planter rests on the edges of one or more steps onto which the caddy is placed.

4. The caddy of claim 1, wherein the angle of the top edges of the first and second side walls is between 20 degrees and 50 degrees in relation to the horizontal plane.

5. The caddy of claim 1, further comprising a vertically disposed second rear wall, wherein the vertically disposed second rear wall is joined at a top edge thereof to a bottom edge of the rear wall; and further wherein sides edges of the vertically disposed second rear wall are joined to rear edges of the first and second side walls.

6. The caddy of claim 5, further comprising a base extending between a bottom edge of the front wall and the bottom edge of the rear wall, the base being pitched at an angle corresponding to the angle of the top edges of the first and second side walls.

7. A caddy for displaying plants on a series of steps comprising:
a first bottom;
a first front wall, a first back wall, and first and second side walls disposed on said first bottom such that said first bottom, first front wall, first back wall, and first and second side walls define a first cavity;
wherein the first and second side walls extend below the first bottom and terminate at a bottom edge, the bottom edge having a staggered arrangement of notches which mirror a top edge of a cut stringer for stairs; and further wherein the caddy is adapted such that the bottom edge of the first side wall and the second side wall are nestable onto a series of steps such that first cavity is disposed at a downward angle; and
wherein a second rear wall vertically disposed between rear edges of the first and second side walls; wherein a top edge of the second rear wall abuts a bottom edge of the first rear wall forming an angle between 100 degrees and 170 degrees.

8. A caddy for displaying an elongated planter box on steps, the caddy comprising:
a first and a second side wall, each having first and second sides, a front edge, a first rear edge, a second vertical rear edge, a top edge, and a bottom edge, wherein the bottom edges have an inclining series of rises and runs adapted for placement on the steps between an upper level and a lower level at a specified angle of inclination, further wherein the top edges are substantially straight and inclined at the specified angle of inclination;
a first front wall disposed perpendicularly between the front edges of the first and the second side walls;
a first rear wall disposed perpendicularly between the first rear edges of the first and the second side walls; and a second rear wall disposed perpendicularly between the second vertical rear edges of the first and the second side walls.

\* \* \* \* \*